United States Patent [19]

Bradley

[11] Patent Number: 5,739,474
[45] Date of Patent: Apr. 14, 1998

[54] ALL WEATHER CABLE CLIP ASSEMBLY WITH LONGITUDINAL GROOVES

[75] Inventor: Edward J. Bradley, 7900 Carneal Rd., Livermore, Calif. 94550

[73] Assignee: Edward J. Bradley, Livermore, Calif.

[21] Appl. No.: 588,669

[22] Filed: Jan. 17, 1996

[51] Int. Cl.$^6$ .................................................. H01B 7/00
[52] U.S. Cl. .................. 174/135; 174/40 CC; 248/74.2
[58] Field of Search .................. 248/71, 74.2, 74.5; 174/135, 40 CC; 24/136 R; D8/394, 395, 396

[56] References Cited

U.S. PATENT DOCUMENTS

| | | | |
|---|---|---|---|
| D. 235,849 | 7/1975 | Hagelberg | D8/396 |
| D. 273,769 | 5/1984 | Sakaguchi | D8/396 |
| 3,241,797 | 3/1966 | Anderson | 248/71 |
| 3,951,367 | 4/1976 | Hagelberg | 248/71 |
| 4,260,123 | 4/1981 | Ismert | 248/74.1 |
| 4,588,152 | 5/1986 | Ruehl et al. | 248/71 |
| 4,903,920 | 2/1990 | Merritt | 248/71 |
| 4,903,921 | 2/1990 | Logsdon | 248/74.5 |
| 5,054,741 | 10/1991 | Ismert | 248/74.5 |
| 5,411,228 | 5/1995 | Morawa et al. | 248/74.5 |
| 5,441,224 | 8/1995 | Ludwig | 248/74.2 |

FOREIGN PATENT DOCUMENTS

| | | | |
|---|---|---|---|
| 76992 | 8/1954 | Netherlands | 248/74.5 |

Primary Examiner—Kristine L. Kincaid
Assistant Examiner—Kamand Cuneo
Attorney, Agent, or Firm—Roger S. Gaither

[57] ABSTRACT

An all weather cable clip assembly (1) having a cable body (2) and a nail or similar fastener (3), is used to secure a coaxial type cable (4) against a mounting surface (16). The cable clip body (2), made of a material that can undergo extreme weather conditions, has an upper surface (4), a lower surface (5), a front surface (6), a back surface (7), a first end surface (8), a second end surface (9), a cable engaging surface (10) and a cable opening (15). The nail is forced into a hole (17) in the body that extends from the upper surface towards the lower surface. In the preferred embodiment the hole has a longitudinal portion that has an upper transverse dimension (18) and a longitudinal portion that has a lower transverse dimension (19), where the transverse dimension of the nail is less than the lower transverse dimension of the hole. The nail is forced into the hole and out the bottom surface, and is retained in the hole by the friction engagement between the surface of the nail and interior surface of the hole at the lower transverse dimension. The cable engaging surface has a plurality of elongated grooves or slots (12) that run parallel to the axis of the cable in the clip. These grooves or slots act as preconditioned weak points in the cable engaging surface so that when a force is applied to the end surfaces of the body, the cable clip body will first deform or bend along those elongated grooves to move in a crimping action around a smaller size of cable (22) that is placed in the clip body. In this way the cable clip assembly of this invention can be used as a "one size fits all" cable clip to securely attach cables of differing sizes to mounting surfaces.

20 Claims, 2 Drawing Sheets

ALL WEATHER CABLE CLIP ASSEMBLY WITH LONGITUDINAL GROOVES

FIELD OF INVENTION

This invention relates generally to a cable clip assembly, and more particularly a cable clip assembly that attaches to cables, such as electrical wires, all types of coaxial cables, fiber optic cables and the like, which clip is then secured to a surface or to which the cable and clip are to be mounted. The cable clip assembly utilizes a nail or similar fastener inserted through the clip as the means by which the clip assembly and cable are secured to the mounting surface. The cable clip of this invention is a "one size fits all" type of clip that can secure cables of various sizes against a variety of surfaces and be used for all types of weather conditions.

BACKGROUND OF THE INVENTION

Several different cable clip assemblies have been used in the prior art to attach wires and cables to mounting surfaces. In the cable TV industry, coaxial cables are used to carry the TV signals into homes, offices and businesses, much as telephone cables carry the telephone signals. Because the cable TV industry was not in existence when many of the buildings and homes were built, then these older structures had to have the coaxial cables installed at a later date. Typically coaxial TV cables are secured to the interior and exterior wall surfaces of buildings and houses when such cable is being installed in the desired locations. Even in new homes that are to be prewired with coaxial TV cable and telephone lines, new cable must be installed and cable clips are needed to do that. A cable clip assembly, such as this invention, expedites that installation by securely retaining the cable to the surfaces along which the cable is being placed.

Many of the prior art clips are made from molded plastic, and when used on surfaces that are exposed to sunlight, certain types of clips degrade and become brittle. If these certain types of plastic clips are also exposed to extreme swings in temperature, then the degradation of the clip is further accelerated. Because of degradation, these certain types of plastic clips are not reliable for use in exterior surfaces where cables are to be secured for long periods of time. There is a need in the cable industry for a cable clip that is strong, resistant to degradation of sunlight and temperature swings, easy to use, relatively inexpensive, and able to be adjusted so that it can be used to secure a number of different sizes of cable to mounting surfaces.

Typically cables that need clips to attach them to the walls and surfaces can come in a variety of sizes and shapes. With the prior art clips, a cable installer would require at least one type of cable clip for each size of cable being installed. In the world of cable installers, there is a need for a cable clip that can fit several sizes of cable, and can grip to the cable itself while the installer drives the fastener into the surface to which the cable can be mounted.

The cable clip assembly of the present invention solves this need by providing a "one-size-fits-all" cable clip where the body of the cable clip is provided with grooves in the cable opening that controls the cable body as its being bent or deformed along the line of the groove to firmly grip the cable in the cable opening. The installer is then able to secure the cable clip to a number of different sizes of cable before the clip and attached cable are secured to the mounting surface.

Examples of prior art cable clips for which the present invention is an improvement include: U.S. Pat. No. 4,588,152; U.S. Pat. No. 3,951,367; U.S. Pat. No. 4,260,123; German Patent No. 1,077,248; PCT International Patent Application No. 8503560; and U.S. Pat. No. 4,903,920 issued to James A. Merritt. In U.S. Pat. No. 4,588,152, the body of the clip is made of plastic type material and the body deforms to guide the fastener into the mounting surface. In U.S. Pat. No. 3,951,367, the cable clip has a pivoting fastener with an expanding base to attach into the surface but the surface of the member gripping the cable cannot be said to have slots or grooves that control the bending or deformation of the member around the cable to firmly hold the cable in the clip. In U.S. Pat. No. 4,260,123, the cable gripping mechanism is a pair of opposing jaws, with each jaw having a plurality of slots or grooves, but the slots or grooves do not function as a means for controlling the bending of the jaws to grip the cable.

The invention of Merritt in U.S. Pat. No. 4,903,920 is directed to a cable clip having elongated upper and lower slots in the body of the clip so that the fastener can be guided into the upper slot. The fastener of Merritt is then driven through the material of the body lying between the slots and into the lower slot. The Merritt clip does not have an elongated hole to guide the fastener into the body, nor does it have slots in the cable engaging surface that controls or aids and assists in the bending and deformation of the body to crimp the cable engaging surface around the cable to secure the cable in the clip. The Merritt patent provides a cable clip that meets some of the needs in the cable industry, but suffers from the problem of not being easy to use and not being able to be used for different sizes of cable. The nail or fastener of Merritt's clip has the disadvantage of not being held in the clip sufficiently so that when a hammer strikes the nail head at an angle to the axis of the nail body, the nail deflects sideways while still held in the clip and then the clip either does not adequately secure the cable to the surface or the clip is rendered ineffective must be replaced. Further problems resulting from use of the Merritt clip is that the mounting surface can be damaged when an installer has difficulty driving the fastener or nail into the mounting surface, and furthermore the cable may be damaged requiring replacement of the entire cable, a costly endeavor. Such damage to cables can be difficult to detect at a later date, and thus there is a need for a cable clip that minimizes such installation problems.

For most cable installations, the cable clip has a nail as the fastener, and the cable installer places the clip over the cable and holds both against the mounting surface. The installer hammers the nail into the mounting surface thereby securely holding the cable to the surface by the clip. It is important for the installer to strike the nail and not the clip or else he can easily damage the cable and even break the clip if it is made of a plastic material.

The present invention is directed to a simple and inexpensive cable clip assembly that can be made by automated equipment using materials that can endure the harshest environmental conditions. The cable clip assembly of this invention is effective in securing different sizes of cable to a variety of surfaces.

Thus this invention solves a long felt need for a small, inexpensive, and simple to use cable clip assembly that can firmly grip onto a cables of different sizes and easily be securely attached to a wide range of surface materials.

Another problem encountered when using the prior art cable clips is that most are fairly large in size and this can create problems in mounting on uneven surfaces and securing the cable. Furthermore, clips of large size create aesthetic issues for the persons that desire the installation of the cable to minimize its visual impact on the surface to which it is mounted.

SUMMARY OF THE INVENTION

The body of the cable clip assembly of the present invention is made from a material that is produced by an extrusion process. The desired material for the cable clip body is forced through an extrusion die to produce the desired shape in the form of a long bar of shaped material. The bar with the extruded shape is then passed into a processing center machine which can cut, debur, treat the surface, drill holes, install a nail or other fastener in the drilled holes, and otherwise produce a finished cable clip assembly that meets the limitations of the present invention. Any of a number of desired materials may be used to make the cable clip, however such material should meet the objective of being an all weather cable clip of the present invention.

It is an object of this invention to provide a simple and inexpensive cable clip assembly that will hold up under harsh weather conditions and is easy to use in attaching a cable to a mounting surface.

It is another object of this invention to provide a cable clip with a cable opening which is of a size that can be adjusted rather easily by bending the clip around the cable to secure it to the clip. This adjusting of the cable opening size can be before or after the clip and cable are secured to the mounting surface.

It is also an object of this invention to make a guide hole in the body of the cable clip for receiving and guiding the path of the fastener, and which guide hole can have an area of reduced diameter to engage the sides of the nail and securely retain the nail in the clip body.

It is yet another object of this invention to produce a cable clip assembly that can be made quite thin and yet be very strong and effective in securing the cable to the mounting surface.

It is a further object of this invention to produce a cable clip assembly that can be used to grip onto a wide range of sizes of cable for mounting on surfaces.

Another object is to provide an improved cable clip assembly that overcomes the deficiencies of the prior art cable clips.

To achieve the foregoing and other objects and in accordance with the purpose of the present invention, as embodied and described herein, this invention provides a simple and easy to use cable clip, the body of which can easily be made from a variety of materials, such as aluminum, copper, alloy materials, steel, plastic, and the like. It is important that the material comprising the body of the clip is extrudable and malleable. The process for making these cable clip assemblies is relatively straight forward, and it can be inexpensive to produce these cable clips in large quantities.

In the preferred mode, the cable clip body making process begins with the desired material being extruded through an extrusion die to produce a long bar of the material having the desired shape. In particular, the desired size, shape and many of the critical features of the clip body are produced in this extrusion process. The extruded bars can then readily be fed into a machine or series of machines that drill the nail holes in the rod, insert the nails into the holes and cut the rod into cable clip bodies of desired lengths to produce the cable clip assemblies of this invention. The cable clip bodies may have edges resulting from the cutting of the bar, and in such case the bodies may need to be deburred to produce smooth edges for the cable clip assemblies. The completed cable clip assemblies can be color coated or otherwise surface treated to obtain different finishes and colors for the cable clips assembly.

The shape of the cable clip body and the number, size and arrangement of the slots, notches or grooves in the cable engaging surface are all features that are designed into the extrusion die. The only essential processes for making the cable clip assemblies of this invention that are done after the extrusion process is the making of the nail holes in the extruded material, inserting the nails into the nail holes and cutting in a transverse direction the extruded material to produce the desired thickness of the cable clip assemblies. These other essential processes can be done by hand, manufacturing processes or individually in a machine, or by a process that does all of these steps automatically.

These and other objectives and advantages of the present invention will no doubt be obvious to those of ordinary skill in the art after having read the following detailed description of preferred embodiment which is illustrated in the various drawing figures.

BRIEF DESCRIPTION OF THE DRAWINGS

The accompanying drawings, which are incorporated in and form a part of the specification, illustrate several embodiments of the present invention and, together with the description, serve to explain the features and principles of the invention.

In the drawings.

DETAILED DESCRIPTION OF THE INVENTION

Figure 1:
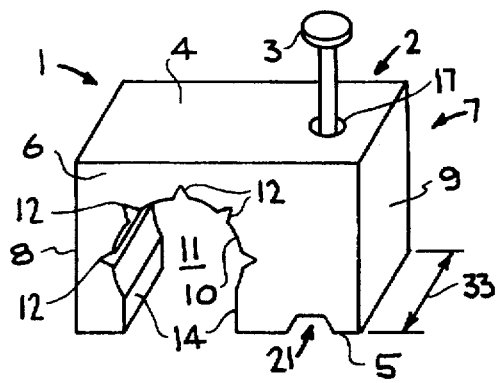
FIG. 1 is a schematic drawing of the cable clip assembly of the preferred embodiment of the invention.

The cable clip assembly 1 of this invention consists of two elements, a cable clip body 2 and a fastener 3. In FIG. 1 the body 2 has a top or upper surface 4, a bottom or lower surface 5, a front surface 6, a back surface 7, a first end surface 8, a second end surface 9, and a cable engaging surface 10. The front surface 6 and the back surface 7 are reverse mirror images of each other when viewed from the back side. The cable engaging surface 10 defines a somewhat circular shaped aperture 11 that goes through the body 2, with the cable engaging surface 10 consisting of a plurality of slots or grooves 12 that extend from the front surface to the back surface of the body. The aperture 11 is further defined by a longitudinal axis 13 that lies in the center of the cross sectional area of the circle that defines much of the shape of the aperture. The axis 13 also defines the center of the aperture 11 from which the slots 12 are arranged around the cable engaging surface 10. The longitudinal axis of the slots 12 are essential parallel with the longitudinal axis 13 of the aperture and thus essentially perpendicular with the front surface and the back surface. The aperture 11 extends through the bottom surface 5 and defines a cable opening 15 lying between two opposing cable gripping surfaces 14. The fastener 3 is generally nails, and more particularly nails which do not easily bend when being hammered into a mounting surface 16.

Figure 4:
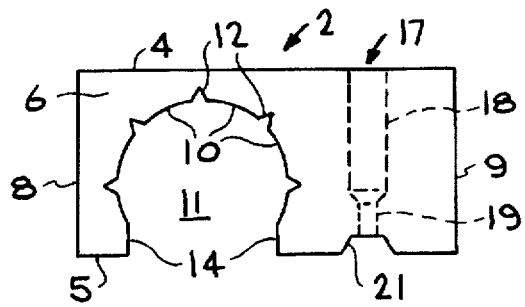
FIG. 4 is a view of the front of the cable body of the invention showing in dotted lines the embodiment with two different sized diameters to the fastener hole.

In FIG. 4 the fasteners 3 are inserted into the cable clip body 2 through a hole 17 in the top surface. The hole 17 can have two diameters, with the diameter of the hole 17 starting at the upper surface 4 being selected to be slightly larger than the diameter of the nail 3 being inserted into the hole. In this way that upper portion 18 of the hole 17 with the larger diameter serves to guide the nail down into the hole to a lower portion 19 of the hole that has a diameter smaller than the diameter of the nail. Then pressure is put on the nail to force the nail and push it into, and preferably through, the lower portion 19 of the hole 17. When the nail is forced into the lower portion, the sides of the nail frictionally engage against the inside surfaces of the lower portion 19 of the hole and it is this friction that retains the nail 3 in the clip body 2 until cable clip assembly is ready to be used.

The diameter and length of the lower portion 19 of the hole will vary with the size and type of fastener used, the material used for the body 2, the amount of force that is preferred for driving the fastener into the body, and the ease with which the fastener is to be removed from the hole. The diameter of this lower portion 19 in relation to the diameter of the fastener 3 will also determine the amount, if any, of excess body material, referred to as flashing 20, that will be driven out the bottom of this lower portion of the hole. A very snug fit is preferred for the fastener so that it will not fall out of the hole during manufacturing, deburring, coating, packaging, shipping or in the possession of a cable installer. Yet the fastener 3 cannot be so firmly held by the friction engagement with the sides of the lower portion 19 of the hole 17 that a cable installer will face difficulty driving the fastener into the mounting surface or cause the cable clip body to become deformed during the installation process.

Figure 6:
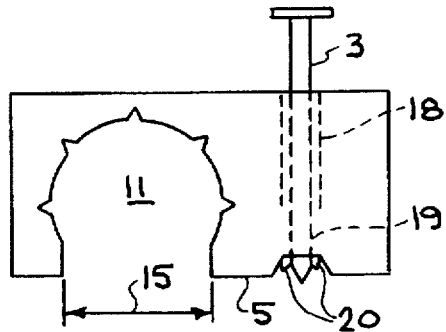
FIG. 6 is a view of the front of the cable clip assembly of the invention showing by dotted lines the position of the fastener within the hole having two different sized diameters.

In FIG. 6, for one embodiment of this invention the hole 17 only has one diameter and the hole 17 does not go out the bottom surface 5 of the body. Thus, in this embodiment there is no lower portion of the hole, but instead the volume where such a lower portion would otherwise be formed now comprises volumes of solid material out of which the clip body is made, and the fastener is then forced through that solid material to secure and retain the nail in the cable clip body. In this embodiment, there will generally be more of the flashing 20 that comes out of the lower surface 5 than in the preferred embodiment of FIG. 4.

If the flashing 20 may be a problem where it can catch or snag on cloth surface or hands, then a channel 21 can be made in the cable clip body 2 at the time of extrusion. The location of the channel 21 is selected so that it extends from the front surface 6 to the back surface 7 and is centered below the longitudinal axis of the hole 17 so that the fastener exiting the hole 17 will drive flashing 20 out into the channel 21. In this way any flashing 20 should be contained within the channel and not go below the plane of the bottom surface 5. The channel 21 need not be much wider than the diameter of the fasteners.

In the preferred embodiment of this invention shown in FIGS. 1-6, the channel 21 has a greater width than the fastener diameter at the lower surface 5 than at the point where the fastener enters the channel so that there is sufficient volume in the channel 21 to contain the flashing 20. Any of a variety of cross sectional designs could be used for the channels, whether it be as a guide for the use in the manufacturing process or be used in an automated installation device.

Figure 3:
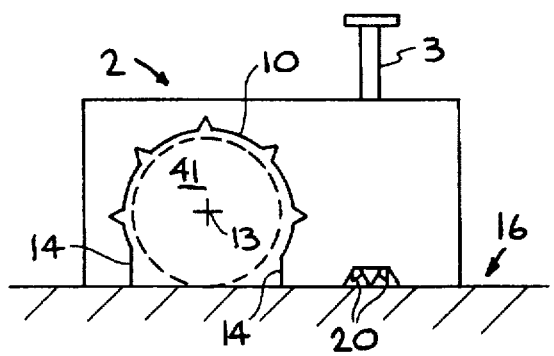
FIG. 3 is a view of the front of the cable clip assembly of the invention on a mounting surface with a representative sample of cable.

In FIG. 3, a cable 41 extending along the axis 13 of the aperture is positioned in a cable clip body 2 and is generally surrounded by a cable engaging surface 10 and held in place by cable gripping surfaces 14. The cable clip assembly is placed against surface 16 where the end of the nail 3 engages the surface 16. With a whack of a hammer, the nail 3 is driven into the surface and the cable 41 is secured to the surface 16.

Figure 5:
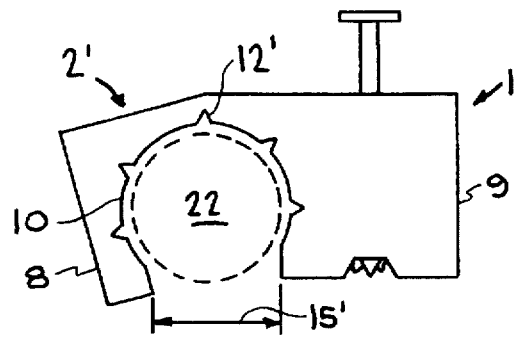
FIG. 5 is a view of the front of the cable clip assembly of the invention after it has been bent or deformed around a smaller sized cable.

In FIG. 5, a cable clip assembly is shown with the cable engaging surface 10 deformed or bent around a smaller size cable 22. The ends surfaces 8 and 9 of the cable body 2' are generally forced towards each other by some sort of pliers, clamping device, or a hammer, to deform and bend the body, adjacent the first end surface 8, along at least one of the slots 12' and thereby crimping the cable engaging surface around the smaller sized cable 22. The cable opening 15' is likewise reduced in size to assure that the smaller cable 22 is securely held in the modified or adjusted cable clip assembly 2'. The location of the groove or slot 12' controls the place of deformation of the clip body around the cable 41. The slots function as a means to control the deformation or bending of the cable gripping surface around a cable. In this way one size of cable clip can be used to effectively secure cables of widely varying diameters for attaching to mounting surfaces.

Figure 2:
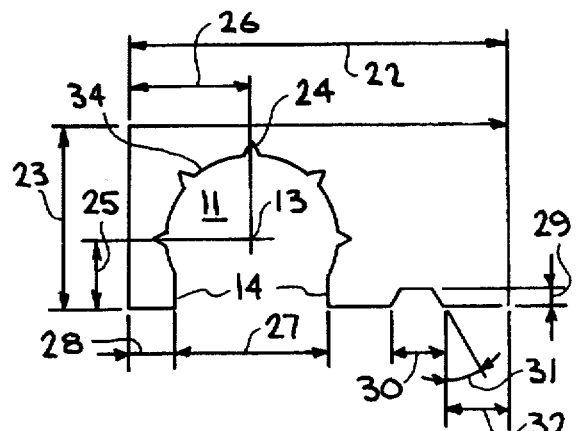
FIG. 2 is a view of the front of the body of the cable clip of the invention.

Reference will now be made to size details of the present preferred embodiment of the invention, an example of which is illustrated in FIGS. 1-6 of the accompanying drawings. The cable clip assembly 1 shown in FIGS. 1-6 represents the preferred embodiment of this invention. In FIG. 2 an example of the dimensions of a preferred size of a cable clip that is manufactured for use with several of the most popular sizes of coaxial cable installed for use with cable TV. These dimensions set forth in Table I below can be modified and varied to meet specific needs, such as different types of cables that may be quite large or different kinds of material out of which the cable clip body is made, and these modifications are within the scope of this invention.

For the preferred embodiment of FIGS. 1-6, the body 2 is made from extruded aluminum. The thickness 33 of the body can be made to be as small as approximately three times the diameter of the fastener 3 and still be strong and effective cable clip for coaxial TV cables. This thickness dimension is approximately one-half of the minimum thickness required for all of the prior art cable clip assemblies, and because of this advantage, the present invention will meet the long felt need in the industry for strong but very small and inexpensive cable clips that can be secured to all types of mounting surfaces and hold up in climates with extreme temperature swings.

TABLE I

| Dimension | Description and I.D. Number in FIGS. 1-3 |
| --- | --- |
| 0.480 inches | Width 22 of body |
| 0.292 inches | Height of 23 of body |
| 0.010 inches | Depth of sides of V-shaped slot 24 |
| 60° degrees | Angle of sides of V-shaped slot 24 |
| 0.115 inches | Height 25 of axis center from bottom |
| 0.165 inches | Width 26 of axis center from first edge |
| 0.210 inches | Width 27 of cable opening |
| 0.060 inches | Width 28 of body between first edge and cable opening |
| 0.032 inches | Depth 29 of channel from bottom surface |
| 0.080 inches | Width 30 of channel at bottom surface |
| 30° degrees | Angle 31 of sides of channel |
| 0.050 inches | Distance 32 of channel from second edge |
| 0.230 inches | Thickness 33 of the cable clip body |
| 0.242 inches | Diameter of the aperture 11 |
| 0.0625 to 0.125 inches | Depth of lower portion 19 of hole 17 |

The present invention described in Table I has the advantage of having a cable opening 15 that is slightly smaller that the outside diameter of two of the more popular coaxial TV cables on the market, namely 6 series and 59 series (also sometimes referred to RG6 and RG59) cable, so that the cable clips can be snapped onto and stay on the cables without nicking the plastic water proof coating on most coaxial cables or causing damage to the cables or requiring the cable installer to crimp the clip around the cable to hold it in place. The shape of the cable clip body keeps the top surface of the clip aligned with the cable when being secured to a mounting surface. Even when the clip is crimped or bent around a much smaller size cable, the fastener and top surface of the crimped clip are maintained in alignment with the cable thereby assuring a good alignment of the fastener for the installer to correctly drive the fastener into the mounting surface.

The 59 series coaxial cable has a nominal outer diameter (or O.D.) that varies from 0.272 to 0.300 inches, with 0.272 inches O.D. being the more popular size. The 59 series coaxial cable has a nominal O.D. that varies from 0.242 to 0.265 inches, with 0.242 inches O.D. being the more popular size. These cable sizes, are well known in the industry, as shown in the General Instrument's, Comm/Scope Division's Dropwire Catalogue No. 32B. However other sizes of coaxial calbe and other types and sizes of cables and wires are within the scope of this invention. For coaxial cables RG6 and RG59, the outer sheath or jacket is typically made of polyvinyl chloride or polyethylene and has a nominal thickness of 0.051 inches. It is important that the cable clip assembly of the invention snuggly secure around the coaxial cable, but not cut through the outer sheath or jacket of the cable or damage the cable in any way. For this reason the cable engaging surface must have sufficient surface variations caused by the elongated grooves or slots to grip the cable effectively but not have sharp surfaces or edges that will readily cut through the cable sheath.

The preferred fastener to be used with the cable clip of this invention is a nail. For a cable clip of the dimensions in Table I, a nail with a diameter of approximately 0.079 inches can be used, and the diameter of the upper portion 18 of the hole 17 can be 0.088 inches. The depth and diameter of the lower portion 19 of the hole 17 will vary depending on whether or not a hardened nail is used, the type of material used for the clip body, and whether or not a channel 21 is put in the bottom surface for the flashing 20 to be pushed into when the nail is forced out of the hole 17. In as much as the present invention does not require use of the more expensive hardened nails, due to the nail not having to be driven through the body material of the clip but instead to through the drilled hole 17, then the cable clip assemblies of this invention can be produced for less cost than prior art cable clips. If a corrosion protective coating is put on the nails to be used with this invention, then the diameter of the lower portion 19 of the hole can be enlarged to make for a snug fit of the nail without excessively scraping the protective coating off the nail as it passes through the lower portions, as is the case for the prior art clips.

Figure 7:
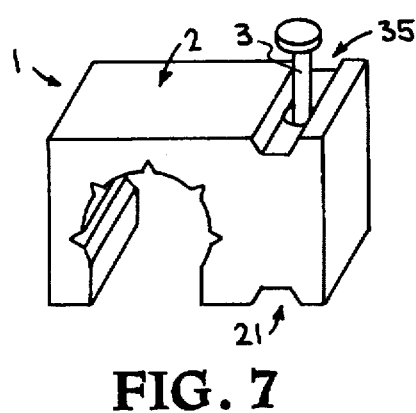
FIG. 7 is a schematic of another embodiment of the invention.
Figure 8:
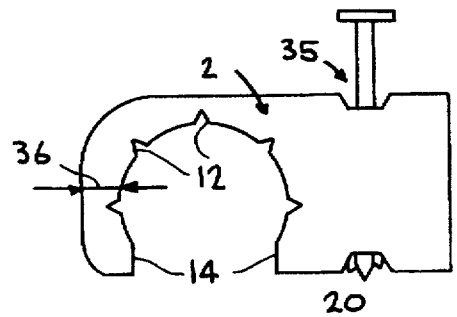
FIG. 8 is a front view of yet another embodiment of the invention.

In FIGS. 7 and 8, a cable clip assembly is shown which has a channel 35 that is similar in size and shape to channel 21. In this embodiment, the channel 35 can assist in the manufacturing of the cable clip assembly by providing an indentation to assist in guiding the drill bit onto the top surface to make the hole in the desired location, and further to also guide the nail or fastener 3 into the drilled hole. Thus the channel 35 assists in the automated manufacturing of the cable clip assembly without detracting from either the strength and rigidity of the cable clip assembly or the ease of using and installing the cable clip assembly. The size and shape of the channel 35 can be the same as that of channel 21 or can be any other shape that assists in the manufacturing.

In FIG. 8, an extrusion mold is redesigned to produce a cable clip body 2 where the lateral thickness 36 of the body material is approximately the same for the cable gripping surface 14 that surrounds one-half of the cable. In this embodiment the cable clip body will more likely bend at any one of or all of the slots 12 in the surface 14 having that lateral thickness 36. Furthermore, for this embodiment the material from which the body 2 is made could have material characteristics that permit more flexing of the cable clip by providing the lateral thickness 36 so that the cable clip could more easily bend outwardly to snap around and grip onto larger sized cable.

Figure 9:
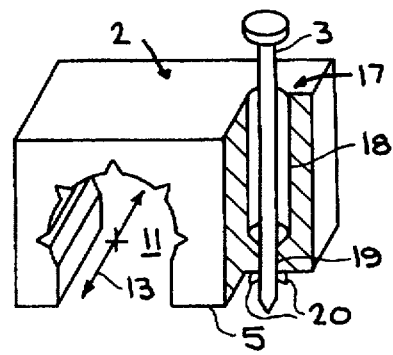
FIG. 9 is a schematic drawing of another embodiment of the invention with a cut out view showing the nail within the hole of the cable clip body of the invention.

In FIG. 9, another embodiment is shown without channels in either the upper or the lower surfaces, but with a cut away portion showing the nail 3 in the hole 17 where the nail 3 does not engage the surface of the hole at the upper portion 18 but does engage it at the lower portion 19. In this embodiment the flashing 20 does protrude below the lower surface 5 of the body 2 around the nail 3. In FIG. 9, the longitudinal axis 13 of the aperture 11 is shown in greater detail, and this axis is generally the same as the longitudinal axis of the cable to be held by the cable clip.

Figure 10:
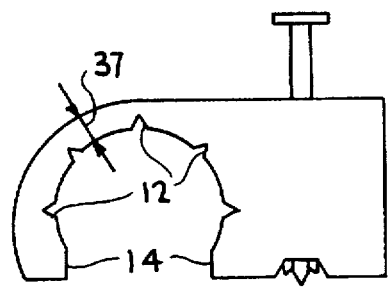
FIG. 10 is a front view of yet another embodiment of the invention.

FIG. 10 shows another embodiment that is similar to the embodiment of FIG. 8 except that the slots 12 in the cable engaging surface 14 are limited to being positioned in that part of the body where the lateral thickness 37 of the cable engaging surface is approximately the same where it engages a cable. In this embodiment, the slots 12 are intended to function primarily as a means to control the positions or lines about which the body will first deform for a cable installer causes the body to be crimped or bent around a smaller size of cable, as well as the slots performing the other function of being edges surfaces to grip into the surface of the cable and more firmly secured the cable in the clip.

Figure 11:
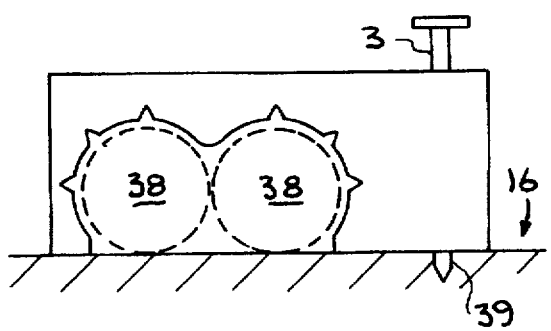
FIG. 11 is a front view of an embodiment of the invention for two cables or a pair of joined cables.
Figure 12:
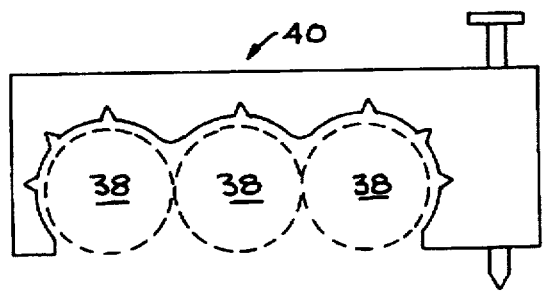
FIG. 12 is a front view of an embodiment of the invention for securing three cables.

FIGS. 11 and 12 are included to show that this invention has equal applicability to cable clip assemblies that are used to secure multiples of individual cables 38 or multiple cables that are made together, side-by-side. In FIG. 11, a mounting surface is shown to demonstrate that it can be useful for the nail to protrude beyond the bottom surface of the clip so that the clip is more likely to maintain its location on the mounting surface if the protruding portion 39 is pushed into the mounting surface before the nail 3 is struck by a hammer.

In all the embodiments of FIGS. 1–12, a plurality of slots 12 are shown in the cable engaging surface 14, however this invention can be used in a cable clip assembly with only one slot 12 so long as that slot is positioned in the body to control the deformation or crimping of the body which can be easily attained, such as that shown in FIG. 5. For the purpose of showing the plurality of slots 12 in the embodiment of FIGS. 1–12, these slots were positioned around the axis 13 of the aperture 11 at 45 degree angles from a plane parallel to the plane of the upper and lower surfaces. Other locations, depths and shapes of the slots 12 are within the scope of this invention.

While the preferred type of fastener for this invention is a nail, other fasteners such as screws, twisted nails, hardened nails, square nails, and the like are clearly within the scope of this invention. Furthermore, multiple fasteners are contemplated within the scope of this invention, such as on both sides of the body 40 of the multi cable clip assembly of FIG. 12.

The foregoing description of a preferred embodiment of the invention has been presented for purposes of illustration and description. Is not intended to be exhaustive or to limit the invention to the precise form disclosed, and obviously many modifications and variations are possible in light of the above teaching. It was chosen and described in order to best explain the principles of the invention and their practical application to thereby enable others skilled in the art to best utilize the invention in various embodiments and with various modifications as are best suited to the particular use contemplated. It is intended that the scope of the invention be defined by the claims appended hereto.

I claim:

1. An all weather cable clip for securing a cable member against a mounting surface comprising:
   (a) a solid body of a predetermined material, with said body having a top surface, a bottom surface, front surface, a back surface, a first end surface, a second end surface and a cable engaging surface;
   (b) said front surface and said back surface being substantially parallel and each extends between the top surface and the bottom surface and between the first and second end surfaces;
   (c) said cable engaging surface defining an aperture that extends through the body from the front surface to the back surface at a location near to and parallel with the first end surface, with the aperture having a central axis that extends through the body in a direction that is substantially perpendicular to the front and back surfaces;
   (d) said cable engaging surface further defining a cable opening in the bottom surface sized to receive the cable into the aperture;
   (e) said cable engaging surface of the body having at least one elongated slot therein, where each of said at least one elongated slot extends from the front surface to the back surface in a line generally parallel with the central axis and further defines at least two elongated cable contacting surfaces;
   (f) said cable contacting surfaces each being rigid surfaces, with one of said elongated cable contacting surfaces located on each side of said at least one elongated slot, and a majority of the elongated cable contacting surfaces are each formed substantially in the shape of a longitudinal concave surface, where said rigid, longitudinally concave shaped cable contacting surfaces are positioned substantially equal distances from and parallel to the central axis of the aperture;
   (g) said body includes an elongated hole for receiving an elongated fastener therein, said elongated hole extends along an axis through the top surface towards the bottom surface, with the axis of the hole being located in a solid portion of the body between the front and back surfaces and between the second end surface and a portion of the cable engaging surface that is nearest to the second end surface;
   (h) said at least one elongated slot in the body further defining a means for controlling the deformation of the body and the cable engaging surface so that when a cable is placed in the aperture and an external force is applied to the body, the body can readily be deformed in a controlled manner along said at least one elongated slot so that some of the elongated cable contacting surfaces can engage and securely retain the cable within the clip; and
   (I) said body further including means for retaining said fastener within said elongated hole.

2. An all weather cable clip according to claim 1, further wherein said means for controlling the deformation of the body and the cable engaging surface further comprise:
   (a) an area of deformation that is bounded by a portion of the top surface, the first end surface and those portions of the cable engaging surface nearest the first end surface and the top surface, such that the area of deformation does not include that portion of the cable engaging surface closest to the solid portion of the body;
   (b) at least one elongated area of reduced thickness of the body in the area of deformation of the body defined by the at least one elongated slot in the body, whereby the body can readily be deformed in the controlled manner along said at least one elongated area of reduced thickness, and
   (c) the at least one elongated area of reduced thickness in the cable engaging surface extending from the front surface to the back surface in a line generally parallel with the central axis.

3. An all weather cable clip according to claim 2, wherein said means for controlling the deformation further comprises a plurality of elongated slots in the cable engaging surface, where each of the plurality of elongated slots further defines an elongated area of reduced thickness of the body in the area of deformation of the body.

4. An all weather cable clip according to claim 3 wherein said plurality of elongated slots further define a plurality of said cable contacting surfaces, where each of said cable contacting surfaces is a rigid surface, and said plurality of cable contacting surfaces together form a substantial portion of a cross-sectional outline of the cable.

5. An all weather cable clip according to claim 3 wherein said elongated slots are located in the cable engaging surface adjacent to the top surface and adjacent to the first end surface of the body, with each of said elongated slots located within the area of deformation.

6. An all weather cable clip according to claim 1, wherein said cable opening in the bottom surface is defined by a pair of essentially parallel and rigid cable gripping surfaces juxtapositioned along said bottom surface and aligned substantially perpendicular to said bottom surface.

7. An all-weather cable clip for retaining a cable against an object comprising:
   (a) a clip body of a predetermined rigid material;
   (b) said body having an upper surface, a lower surface, a front surface, a back surface, a first end surface, and a second end surface, wherein substantial portions of said surfaces of the body lie in planes that generally form the shape of a parallelepiped, and further wherein a distance between the upper surface and the lower surface determines the height of the body;
   (c) said body further includes a cable engaging surface defined by an aperture having a central axis and extending through the body from said front surface to said back surface, and further where said aperture defines a cable opening in the lower surface which is sized to receive the cable;
   (d) said body further includes an elongated hole having a longitudinal dimension, an upper transverse dimension and a lower transverse dimension, wherein the hole passes through the upper surface towards the lower surface along an axis that is substantially perpendicular to the upper surface, and further wherein said axis of said hole being located between the front surface and the back surface and passing through a portion of the body adjacent the second end surface;
   (e) means for retaining an elongated fastener within said elongated hole;
   (f) said cable engaging surface having at least one elongated slot therein that extends from the front surface to the back surface in a line generally parallel with the central axis to define at least two cable contacting surfaces;
   (g) said cable contacting surfaces being rigid surfaces positioned on each side of said at least one elongated slot; and
   (h) said at least one elongated slot and said at least two cable contacting surfaces comprising a means for controlling the deformation of the cable engaging surface around a cable to retain said cable.

8. An all weather cable clip according to claim 7, wherein a portion of the longitudinal dimension of the elongated hole that coincides with the upper transverse dimension is less than the height of the body such that the upper transverse dimension of the hole does not extend to the lower surface.

9. An all weather cable clip according to claim 8, wherein the upper transverse dimension of the hole is located between the upper surface and the lower transverse dimension, and wherein the lower transverse dimension of the hole is less than a transverse dimension of the fastener.

10. An all weather cable clip according to claim 9, wherein the longitudinal dimension of the fastener is greater than the height of the body, and the hole extends into and through the lower surface, and wherein the fastener is forced into the hole at the upper surface and extends out the lower surface.

11. An all weather cable clip according to claim 10, wherein the elongated hole has side surfaces, and the means for retaining the elongated fastener within the hole is a friction engagement between the fastener and the side surfaces of the hole, wherein the lower transverse dimension of the hole is less than the transverse dimension of the elongated fastener.

12. An all weather cable clip according to claim 11, wherein the longitudinal dimension of the hole corresponding to the upper transverse dimension of the hole is at least twice the longitudinal dimension of the hole corresponding to the lower transverse dimension of the hole.

13. An all weather cable clip according to claim 8, wherein said body includes a solid portion of the material between the lower surface and the elongated hole along the axis of the hole, and further wherein said means for retaining the fastener in the hole is a friction engagement between the fastener and said solid portion of the material.

14. An all weather cable clip assembly for securing at least one cable member against a mounting surface that is expected to undergo severe weather conditions comprising:
   (a) a rigid elongated fastener having a longitudinal dimension and a transverse dimension; and
   (b) a cable clip body comprising:
      (1) said body consisting of a rigid extruded material where the body has an upper surface, a lower surface, a front surface, a back surface, a first end surface, a second end surface, and a cable engaging surface;
      (2) a major portion of said upper surface is substantially parallel with a major portion of said lower surface, wherein a distance between the upper and lower surface defines the body height, and further wherein said front surface is substantially parallel with said back surface;
      (3) an elongated hole passing through a portion of said body where said elongated hole extends from said major portion of the upper surface along an axis of the elongated hole towards said major portion of the lower surface, wherein said elongated hole is positioned in a solid portion of the body closer to the second end surface than to the first end surface, and further wherein the axis of the elongated hole is substantially perpendicular to the upper surface;
      (4) said elongated hole has a longitudinal dimension and at least one transverse dimension, wherein the longitudinal dimension of the elongated hole is less than the distance between said major portions of said upper and lower surfaces but is more than one-half of the body height, and further wherein said at least one transverse dimension of the elongated hole is greater than the transverse dimension of the elongated fastener;
      (5) said cable engaging surface being positioned between said solid portion and said first end surface,
      (6) wherein said cable engaging surface defines a cable opening formed in the bottom surface by two opposing cable engaging edges in the bottom surface sized to receive at least one cable therein, and further wherein said cable engaging surface is further defined by an aperture that extends along a central axis from said front surface through to said back surface, where said central axis is substantially perpendicular to said back surface and said front surface;
      (7) said cable engaging surface of the body having at least one elongated slot therein that extends from the front surface to the back surface in a line generally parallel with the central axis to define at least two elongated cable contacting surfaces;
      (8) said at least two elongated cable contacting surfaces being rigid surfaces, one on each side of said at least one elongated slot, and said elongated cable contacting surfaces are substantially equal distances from and parallel to the central axis of the aperture;
      (9) said elongated slot and said at least two elongated cable contacting surfaces comprising a means for controlling the deformation of the cable engaging surface around a cable to securely retain a cable within the cable clip body; and

(10) means for retaining said elongated fastener within said hole.

15. An all weather cable clip assembly according to claim 14, wherein said means for controlling the deformation of the cable engaging surface further comprises a plurality of elongated slots in the cable engaging surface and a plurality of rigid cable contacting surfaces, where each of said elongated slots has an elongated cable contacting surface on each side thereof and the rigid cable contacting surfaces are substantially equal distances from and parallel to the central axis of the aperture.

16. An all weather cable clip assembly according to claim 15, wherein said elongated hole has a second transverse dimension that is smaller than said at least one transverse dimension of the hole, and further wherein said at least one transverse dimension of the hole extends from the upper surface along the axis of the hole towards the bottom surface to a point where the second transverse dimension of the hole begins, and the second transverse dimension of the hole then continues along the axis of the hole by a longitudinal dimension towards the bottom surface.

17. An all weather cable clip assembly according to claim 16 wherein that portion of the hole along the longitudinal dimension of the hole corresponding to the second transverse dimension of the hole comprises the means for retaining said elongated fastener within said hole.

18. An all weather cable clip assembly according to claim 14 wherein the means for retaining said elongated fastener within said hole comprises friction engagement between said fastener and some of the extruded material in a portion of the body along the axis of the hole between the lower surface and that part of the elongated hole corresponding to said second transverse dimension of the hole.

19. An all weather cable clip assembly according to claim 18 wherein if an external force is applied to one at said first or second end surfaces of the body, the body can readily be deformed along the at least one elongated slot with a portion of said first end surface moving toward said second end surface and thereby moving at least one of the elongated cable contacting surfaces into engagement with a cable that has been received in the cable opening.

20. An all weather cable clip assembly according to claim 14, wherein said at least one elongated slot in the cable engaging surface further defining at least one elongated area of reduced thickness of the body in an area of deformation of the body, and including said means for controlling the deformation of the body and the cable engaging surface so that when a cable is placed in the aperture and an external force is applied to one of said first or second surfaces of the body, the body will readily deform along at least one of said elongated area of reduced thickness so that the elongated cable contacting surfaces on each side of the at least one elongated slot can move into, engage and securely retain the cable within the clip in a controlled manner.

* * * * *